United States Patent
Holt et al.

(10) Patent No.: US 7,051,273 B1
(45) Date of Patent: *May 23, 2006

(54) CUSTOMIZING FORMS IN AN ELECTRONIC MAIL SYSTEM UTILIZING CUSTOM FIELD BEHAVIORS AND USER DEFINED OPERATIONS

(75) Inventors: Nick Holt, Seattle, WA (US); Steve Thomas, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/938,468

(22) Filed: Aug. 14, 1996

Related U.S. Application Data

(63) Continuation of application No. 08/334,616, filed on Nov. 3, 1994, now Pat. No. 5,557,723, which is a continuation of application No. 08/207,231, filed on Mar. 7, 1994, now abandoned, which is a continuation of application No. 07/621,444, filed on Nov. 30, 1990, now abandoned.

(51) Int. Cl.
  G06F 15/00   (2006.01)
  G06F 17/00   (2006.01)
(52) U.S. Cl. ............ 715/506; 715/505; 715/507; 715/508
(58) Field of Classification Search ........ 707/505, 707/530, 507, 506, 520, 501.1; 712/1; 345/347, 345/333, 809; 283/70; 715/503–508, 500
See application file for complete search history.

(56) References Cited

U.S. PATENT DOCUMENTS

| | | | |
|---|---|---|---|
| 4,403,301 A | 9/1983 | Fessel | 358/1.8 |
| 4,481,603 A | 11/1984 | McCaskill et al. | 707/507 |
| 4,651,288 A | 3/1987 | Zeising | 358/1.18 |
| 4,807,155 A | 2/1989 | Cree et al. | 345/329 |
| 4,831,526 A * | 5/1989 | Luchs et al. | 707/530 |
| 4,884,217 A | 11/1989 | Skeirik et al. | 706/56 |
| 4,918,723 A | 4/1990 | Iggulden et al. | 379/100.17 |
| 4,931,987 A | 6/1990 | Kawakami | 707/524 |
| 4,939,689 A | 7/1990 | Davis et al. | 707/102 |
| 4,970,665 A | 11/1990 | Doi et al. | 707/523 |
| 5,021,973 A * | 6/1991 | Hernandez et al. | 715/504 |
| 5,033,009 A | 7/1991 | Dubnoff | 707/503 |
| 5,060,980 A * | 10/1991 | Johnson et al. | 283/70 |
| 5,091,868 A * | 2/1992 | Pickens et al. | 707/506 |

(Continued)

OTHER PUBLICATIONS

Morris, James H. Et al., Andrew: a distributed personal computing environment, Communications of the ACM, vol. 29, Issue 3, pp. 184-201, Mar. 1986.*

(Continued)

Primary Examiner—William Bashore
(74) Attorney, Agent, or Firm—Workman Nydegger

(57) ABSTRACT

User-customizable forms in an electronic mail system enable an administrator to select customized field types and customized behaviors. The electronic mail system provides for the receiving and displaying of mail information in conjunction with the use of a user-customizable form. An administrator creates a customized field of a customized form by selecting a field type from a among multiple defined field types and a behavior from among multiple behaviors. When data is entered by a user to the customized field having the selected field type, the selected behavior is applied to the data. In this manner, the administrator has the flexibility of creating a variety of customized forms in the electronic mail system, and is not limited to a relatively small number of predefined forms.

20 Claims, 14 Drawing Sheets

U.S. PATENT DOCUMENTS

| | | | | |
|---|---|---|---|---|
| 5,105,355 | A | | 4/1992 | Yoshida et al. ............. 707/531 |
| 5,119,476 | A | | 6/1992 | Texier ........................ 345/347 |
| 5,121,499 | A | * | 6/1992 | McCaskill et al. ........... 715/503 |
| 5,140,676 | A | | 8/1992 | Langelaan .................. 707/515 |
| 5,144,555 | A | | 9/1992 | Takadachi et al. .......... 707/530 |
| 5,144,693 | A | | 9/1992 | Morgan ....................... 345/342 |
| 5,182,705 | A | | 1/1993 | Barr et al. ..................... 705/11 |
| 5,208,906 | A | * | 5/1993 | Morgan ....................... 707/520 |
| 5,222,211 | A | | 6/1993 | Mueller et al. .............. 707/506 |
| 5,404,294 | A | * | 4/1995 | Karnik ........................ 707/507 |
| 5,745,712 | A | * | 4/1998 | Turpin et al. ................ 345/333 |
| 5,862,395 | A | * | 1/1999 | Bier .............................. 712/1 |

OTHER PUBLICATIONS

Miller, Michael J., PerForm Pro defines the state of the art in forms packages, InfoWorld, vol. 12, No. 39, Sep. 24, 1990, p. 88.*

Litwin, Paul, Looking Good: the complete guide to enhancing your forms!, Data Based Advisor, vol. 8, No. 9, Oct. 1990, pp. 66-72.*

Getting Started With Microsoft Excel Version 2.2, 1989 Microsoft Corporation, pp. 5-19.*

Dayton, Doug, PerForm Pro expands simple WYSIWYG form design, filling, PC Week, vol. 7, No. 39, Oct. 1, 1990, pp. 33-35.*

Creating and Managing the Business Form Electronically, The Office, Stamford, Nov. 1986, vol. 104, Issue 5, p. 1-5.*

Goodman, Danny, The Complete HyperCard Handbook, Sep. 1987, Bantam Books, Inc. pp. 56-63, 85-183.*

Kovac, C. "E-mail Streamlines Paper Giant," *Communications News* vol. 25, No. 9, Sep. 1988, pp. 42(2).

Acerson, *WordPerfect: The Complete Reference,* Series 5 Edition, McGraw-Hill, 1988, pp. 1091-1124.

Think Technologies, Inc., *InBox Desktop Communications Software User's Guide,* 1986, pp. 1-1 through 4-9, and I-1 through I-9.

Lund, Luke and Bill Davis, QM Forms™ for Apple® Macintosh® Third Edition, CE Software, Inc., 1989, pp. 1-17.

Lund, Luke, *QuickMail™ User Manual for Apple® Macintosh® Computers,* Third Edition, CE Software, Inc., 1988, pp. 23 and 38.

* cited by examiner

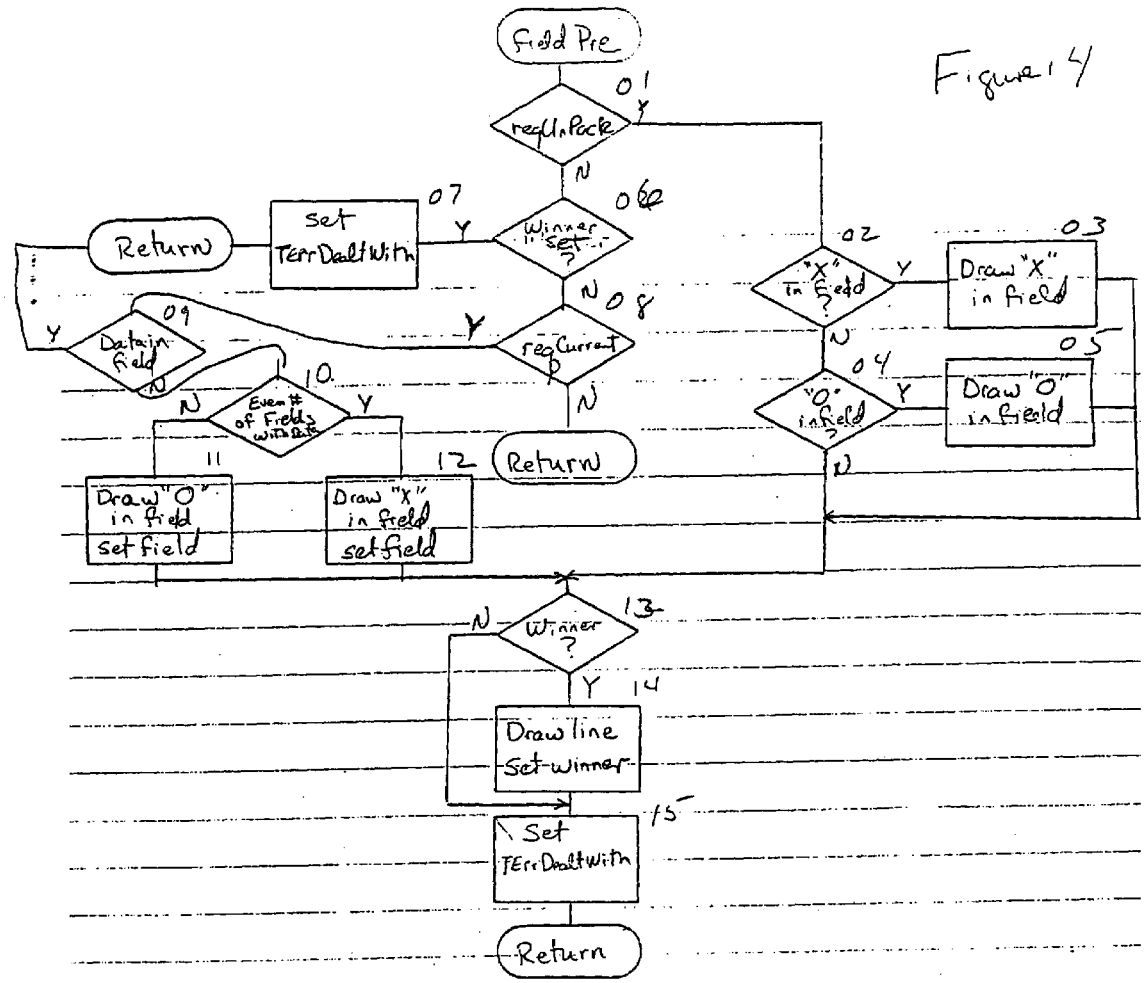

CUSTOMIZING FORMS IN AN ELECTRONIC MAIL SYSTEM UTILIZING CUSTOM FIELD BEHAVIORS AND USER DEFINED OPERATIONS

CROSS-REFERENCE TO RELATED APPLICATIONS

This application is a continuation of U.S. patent application Ser. No. 08/334,616, filed Nov. 3, 1994 now U.S. Pat. No. 5,557,723, which is a continuation of U.S. patent application Ser. No. 08/207,231, filed Mar. 7, 1994 now abandoned, which is a continuation of U.S. patent application Ser. No. 07/621,444, filed Nov. 30, 1990 now abandoned.

TECHNICAL FIELD

This invention relates to an improved method and system for communicating information through electronic mail system and in particular a method and system of using customizable forms in an electronic mail system.

BACKGROUND OF THE INVENTION

It is common in written communications to use standard forms. Examples of standard forms are credit application and phone message slips. These forms allow for the collection of certain data in a structured format. This structured format simplifies the processing of the data.

In computer systems, data is often gathered and displayed through the use of electronic forms. For example, a computer program could display a form that looks similar to the paper version of a credit application form. This similarity simplifies the entry of data into the computer and subsequent display of the data.

An electronic mail system allows mail to be collected electronically through a computer terminal and transmitted to another computer or another user of the same computer and displayed on a terminal. Typical mail systems use certain standard forms. For example, the standard send message form 100 as shown in FIG. 1 has a to field 101 into which the user enters the recipient of the mail messages and a re field 102 into which the user enters the subject of the mail. The send message form 100 also has text field 103 into which the user enters the body of the message. A mail system would typically have an analogous receive message form for displaying a message.

A few mail systems have allowed the user to add custom forms. These mail systems provide only limited customization. The customization is typically limited to the use of predefined components. For example, the forms designer could specify where to place a text field or a date field. However, the mail system predefines how the fields will operate. When a user of a form presses a key or uses a mouse button to click on a component of a form, the mail system will typically take one or more actions in response to that input. The actions taken when a button field is clicked, for example, is referred to as the "behavior" of the button. Each form component in custom forms traditionally has a single behavior or a fixed number of possible predefined behaviors.

While this limited customization allows for some degree of user-customization of electronic mail forms, the user is limited to the predefined components and behaviors.

SUMMARY OF THE INVENTION

It is an object of the present invention to provide a method and system for customizing forms in an electronic mail system.

It is another object of the present invention to provide an electronic mail system in which the user of the mail system can specify the field layout of a custom form and specify the behavior of the fields in the custom form.

It is another object of this invention to provide an electronic mail system that collects data through a custom form, packs the data into a mail message, and transports the mail message to the specified recipients of the mail.

It is another object of this invention to provide an electronic mail system that receives mail messages, unpacks the data from the mail message, and displays the data in a custom form.

It is another object of the present invention to provide an electronic mail system with a transaction event processor to receive mail events and to call a form control procedure to implement the behavior of the custom form.

It is another object of the present invention to provide a layout for a form data structure that includes the definition of the form fields and the form control procedure.

BRIEF DESCRIPTION OF THE DRAWINGS

FIG. 14 is a flow diagram of subroutine fieldPre.

DETAILED DESCRIPTION OF THE INVENTION

In a preferred embodiment of the present invention, an electronic mail system implements user-customizable forms that allow the user to define form components and their behavior. This invention allows a user to specify the layout of a custom form and specify a form control procedure (FCP) to control the behavior of the form components. The FCP is a computer subroutine that implements user-defined processing of the form. The form is defined in a form data structure that contains the layout of the form and the FCP. The mail system interacts with the FCP to collect form data and transmit the data to a receiver. The mail system also interacts with the FCP to display the message through the custom form when it is received.

In a preferred embodiment, the mail system has a transaction event manager (TREV) that calls the FCP. The TREV creates a window for the form and displays the form in the window. When certain events occur, such as keyboard entry, for the window, the TREV calls the FCP. This calling allows the FCP to perform custom processing.

Figure 1:
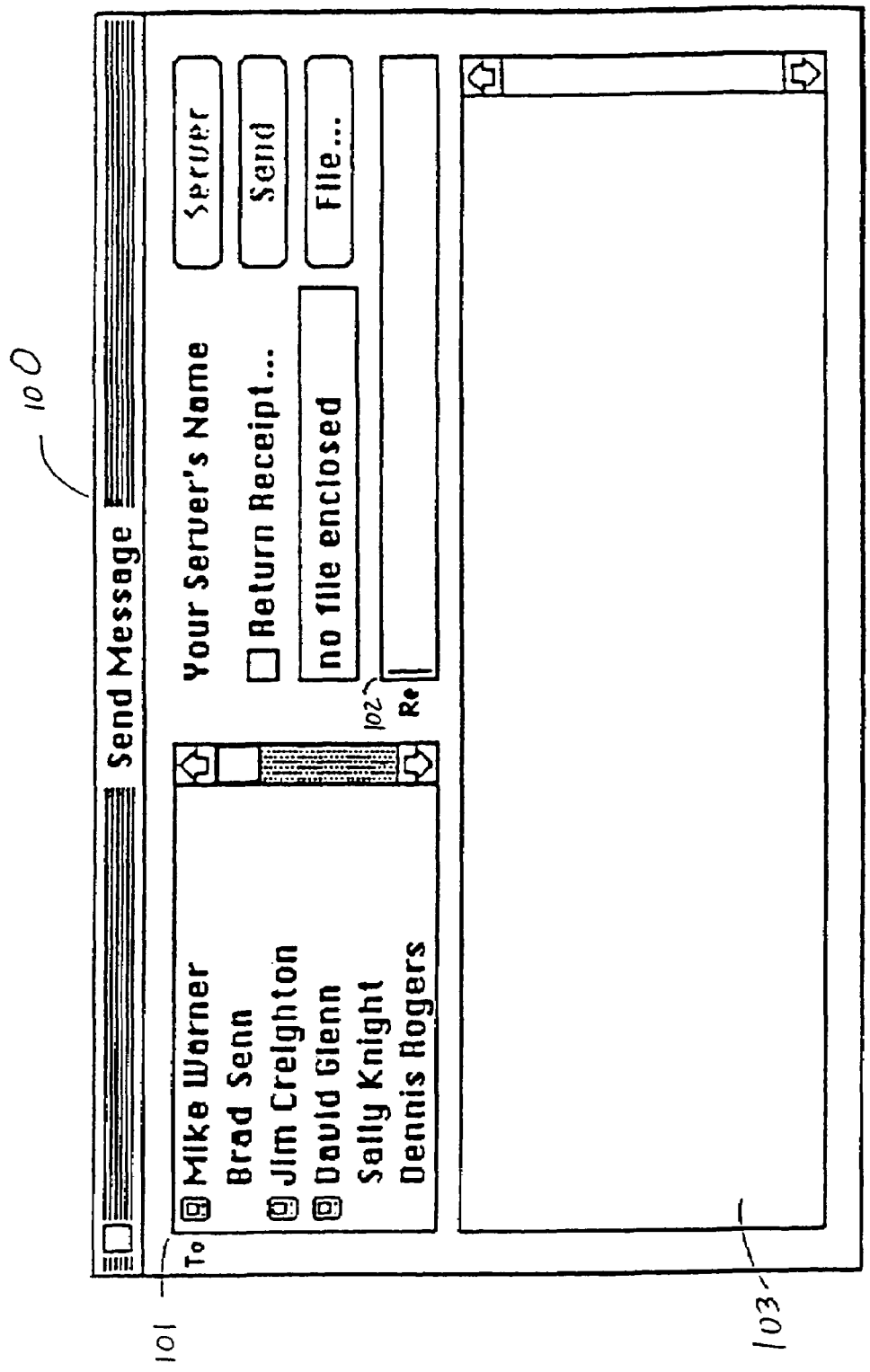
FIG. 1 shows an example of a typical send message form.
Figure 2:
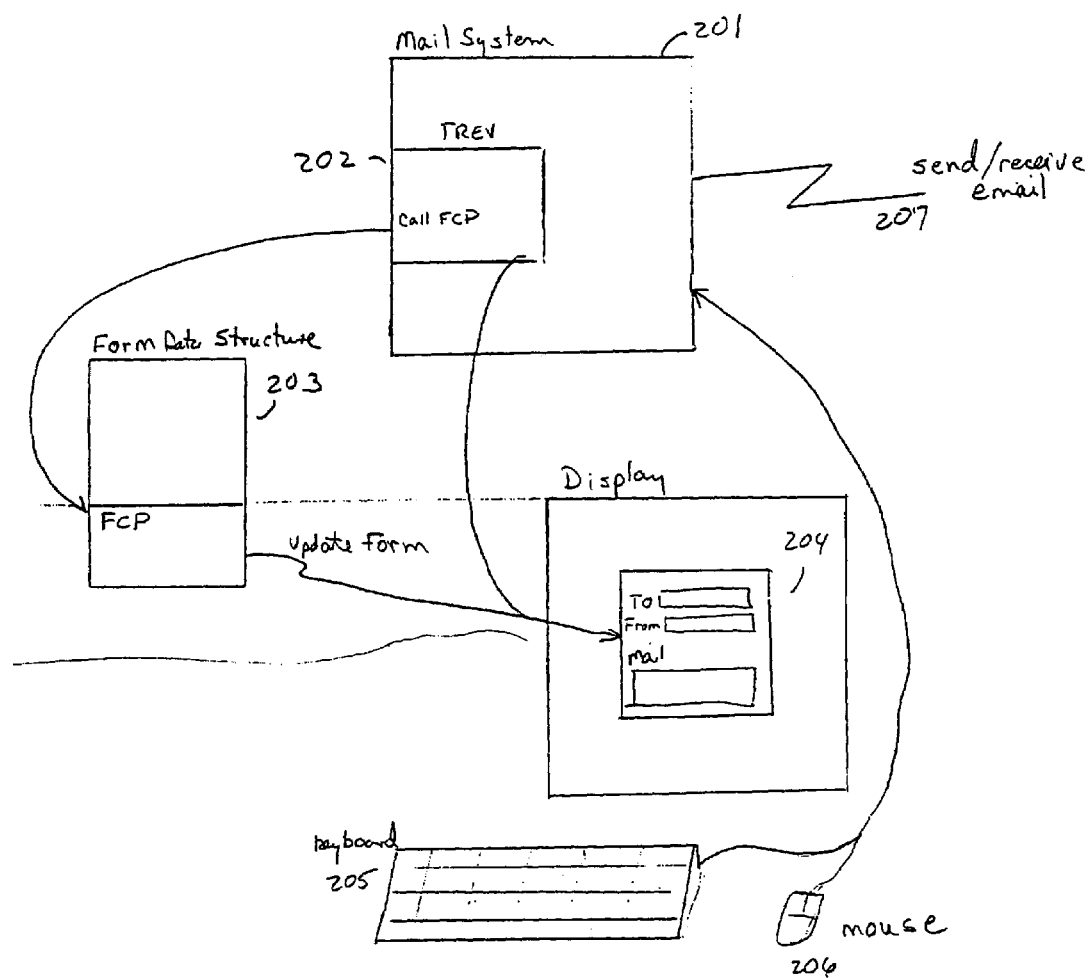
FIG. 2 shows the components of a mail system that implements custom forms.

FIG. 2 shows the components of a mail system that uses custom forms. The mail system 201 contains the TREV 202.

The TREV accesses the form data structure 203 to display the form window 204. The mail system 201 receives input from the keyboard 205 and mouse 206. The mail system 201 packs the message data into mail message format and transports the message to the recipient via electronic mail link 207. The mail system 201 also receives mail messages via electronic mail link 207 and unpacks the messages.

Figure 3:
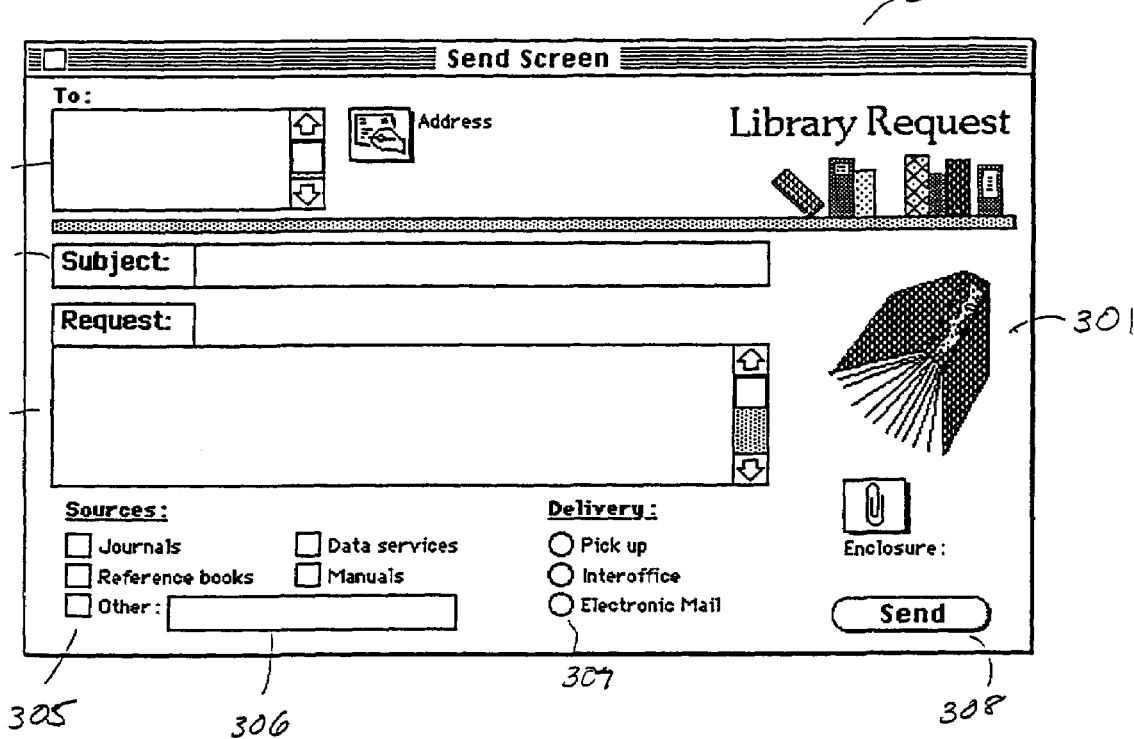
FIG. 3 shows an example of a custom form.

FIG. 3 shows an example of a custom mail message form. The form 300 is designed to handle library requests. The form 300 contains picture 301 that is suggestive of the function, field 302 that is a scroll list in which the user selects the recipient's names, subject field 303 which is a text field, request field 304 which is a scrolling text field, check boxes 305 which select the source, other field 306 which is a text field, radio button fields 307 which select the delivery means, and send button field 308 which allows the user to indicate that the message is to be sent.

Form Data Structure

Figure 4:
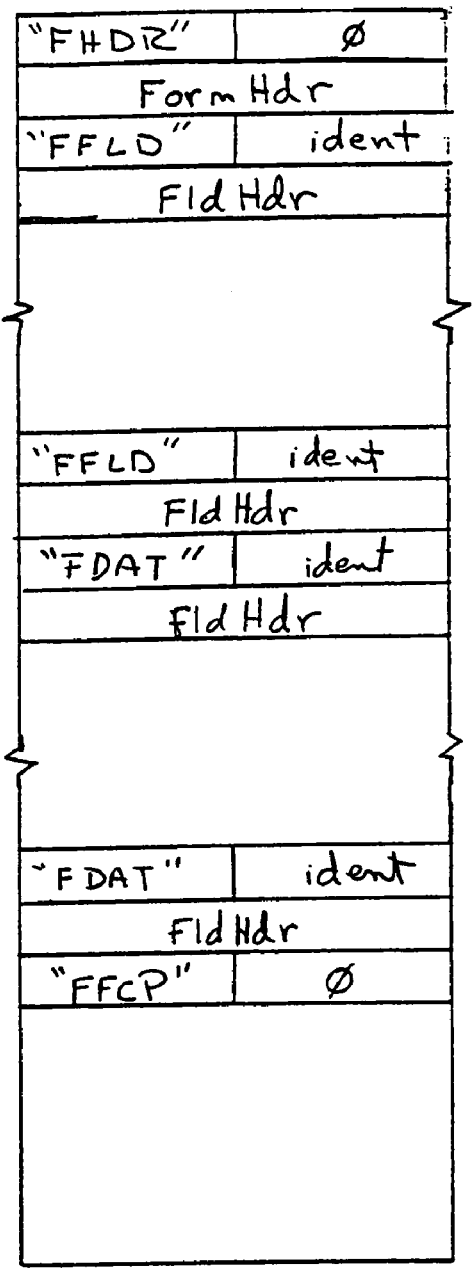
FIG. 4 shows the layout of the form data structure.

A custom form is defined in a form data structure. The form data structure describes the design and layout of the form. It describes the initial size of the form and initial placement of the form on the display. It describes the placement of predefined form components, such as buttons and text fields, and the placement and appearance of user-defined form components. The appearance of user-defined form components may be defined as an arbitrary bitmap image. FIG. 4 shows the layout of the form data structure of a preferred embodiment. The form comprises four types of elements: form header, field object, form control, and form control procedure. In a preferred embodiment, the elements have variable lengths and have a primary and secondary key to allow fast retrieval of the elements. Alternatively, the FCP could be stored separate data structure.

Form Header

The form header contains information describing the window in which the fields are displayed. The form data structure contains only one form header which is the first entry in the form data structure. The primary key of the form header is "FHDR" and the secondary key is 0. The following data structure, as specified in the "C" programming language, defines a preferred format of form header.

```
typedef struct FormHdr
{
    char            formFlags;
    char            formProcId;
    Rect            formCoords;
    short           formCurField;
    unsigned char   formTitle[];
} FormHdr, *FormHdrPtr
```

The variable formFlags specifies automatic positioning of the window and controls the appearance of the window. The variable formFlags can be set to a combination of values as described in the following. The variable formFlags is set to the value ffNoFlags to indicate that variable formCoords contains the coordinates of the window and variable formProcId contains the style of the window. The variable formFlags is set to the value ffTBCentre to indicate that the window is to be centered vertically. The variable formFlags is set to the value ffLRCentre to indicate that the window is centered horizontally. The variable formFlags is set to the value ffTBLRCentre to indicate that the window is centered both vertically and horizontally. The variable formFlags is set to the value ffAtBottom to indicate that the window is to be placed at the bottom of the screen. The variable formFlags is set to the value ffNoMailIcon to indicate that the mail icon is not to be drawn oh the title bar. The variable formFlags is set to the value ffModal to indicate that the window is modal. The variable formFlags is set to the value ffGoAway to indicate that the window has not go away box.

The variable formProcId specifies the style of window. In a preferred embodiment the style can be modeless or modal.

The variable formCoords specifies the screen position and size of the form window. This positioning information can overridden by the setting of variable formFlags.

The variable formCurField is used internally by the TREV to store what field is current.

The variable formTitle is a string that is displayed in the title bar of modeless form windows.

Field Objects

A form consists of a number of fields. Each field object describes the characteristics of a field of the form. For each field there is one field object in the form data structure. The primary key of a field object is "FFLD" and the secondary key is set to a unique identifier for that field; typically, the identifier would be a descriptive of the field. For example, an address field may have a secondary key equal to "ADDR." The following data structure defines a preferred format of the field objects.

```
typedef struct FldHdr
{
    short           type;
    unsigned short  attributes;
    Rect            coords;
    unsigned short  keyEquiv;
    PackedFont      font;
    Handle          data;
    Handle          private;
    unsigned char   initData[ ];
} FldHdr, *FldHdrPtr;
```

The variable type indicates the type of the field. The following describes some preferred standard field types. One skilled in the art would know that other standard field types can be defined. The variable type is set to the value fieldStaticText to indicate that the text in the field cannot be edited. The variable type is set to the value fieldEditText to indicate that the text in the field can be edited, for example, subject field 303. The variable type is set to the value fieldHiddenText to indicate that the text in the field can be edited but is not echoed to the display. The variable type is set to the value fieldButton to indicate that the field is a standard button, for example, button field 308. The variable type is set to the value fieldRadioButton to indicate that the field is a standard radio button, for example, radio button fields 307. The variable type is set to the value fieldCheckBox to indicate that the field is standard check box, for example, check boxes 305. The variable type is set to the value fieldButtonIcon to indicate that the field displays a button in the shape of the specified icon. The variable type is set to the value fieldOptionButton to indicate that the field displays a button with a specified title string. The variable type is set to the value fieldTime to indicate that the field displays the time of day. The variable type is set to the value fieldDate to indicate that the field displays the date. The variable type is set to the value fieldRect to indicate that a rectangle is drawn around the field. The variable type is set to the value fieldPicture to indicate that the field displays the specified picture, for example, picture 301. The variable type is set to the value fieldVariableData to indicate that the field contains data that is not displayed on the screen. The variable type is set to the value fieldUser to indicate that the field is a user-defined field.

The variable attributes specifies the appearance and behavior of the field. One skilled in the art would know that other values for the variable attributes could be defined to specify different appearances and behaviors. The variable attributes is set to the value attrCanBeCurrent to indicate that the field can be the current field. The current field is the field that receives characters entered by the user. The variable attributes is set to the value attrInform to indicate that the FCP is to be called by the TREV whenever the field is affected by a user event, such as, a mouse click or entry of a character (if the field is current). The variable attributes is set to the value attrPack to indicate that the field contents will be packed into the mail message when a send message request is detected by the mail system, for example, when the user clicks button field 308. The variable attributes is set to the value attrIdle to indicate that the FCP will be called periodically. This periodic calling allows fields, such as a time field, to be updated. The variable attributes is set to the value attrReadOnly to indicate that the field is read only. The variable attributes is set to the value attrDisabled to indicate that the field is drawn differently to indicate that it is disabled (usually grey). The variable attributes is set to the value attrGroup1, attrGroup2, attrGroup3, or attrGroup4 to indicate that the field is in an attribute group. The variable attributes is set to the value attrDependCheckState, attrDependSetState, or attrDependSetNegState to define the functioning of a group. A group of fields allows for the enabling and disabling of fields within the group based on whether other fields in the group contain data. When data is entered or deleted from a field, the TREV checks all the fields in the group that have the variable attributes set to the value attrDependCheckState set. If all these fields have data, then the TREV enables all the fields in the group that have the variable attributes set to attrDependSetState and disables all the fields in the group that have the variable attributes set to attrDependSetNegState.

The variable coords contains the coordinates of the rectangle that defines the field in the window.

The variable keyEquiv contains the keyboard equivalent for many types of fields, such as a button field.

The variable font contains the font, face, and size of the text that is displayed in the field.

The variables data and private are handles that are used at run time to store information about the field.

Form Control

The form control fields are a special class of fields that are not referenced or modified by the TREV. The field serves to store global variables for an FCP. The variables are preserved between calls to the FCP. The primary key is "FDAT" and the secondary key is a unique identifier for the field.

Form Control Procedure

The Form Control Procedure (FCP) is a computer subroutine routine that is called directly by the TREV. The FCP is written by the forms designer to implement form customization. The FCP is a block of code stored as the last entry in the form data structure. In a preferred embodiment, the FCP is written in assembly language or another programming language that is compiled into machine code. Alternatively, the FCP can be written in a scripting language or pseudo-machine language that is interpreted. The use of a scripting language or pseudo-machine language would facilitate platform independent custom forms. In a preferred embodiment, the FCP has full access to the computer resources. Alternatively, the FCP could be restricted as to the resources used. For example, the FCP could be restricted to the operating system calls available to it. The primary key of the FCP id "FFCP" and the secondary key is zero. The following defines the format of the call to the FCP.

```
pascal OSErr FCP (UpCall, callType, win, ident, req,
   arg)
      ProcPtr        UpCall;
      short          callType;
      WindowPtr      win;
      long           ident;
      short          req;
      long           arg;
```

The parameter UpCall is an address of a procedure that can be called by the FCP. This parameter provides a convenient mechanism for allowing the FCP to access the internal functions of the mail system. For example, the mail system may support a field type defined as a list, for example, to field 302. The mail system may have routines, such as an add-item-to-list routine, to manipulate lists. The FCP can access these routines through the procedure pointed to by the parameter UpCall.

The parameter callType specifies what particular action the FCP is asked to perform. The parameter callType can be set to the following values: fcpFormEvent, fcpFieldPre, fcpFieldPost, or fcpUserField.

The parameter callType is set to the value fcpFormEvent to allow the FCP to deal with form-specific events. A form-specific event would be global initialization of FCP internal variables. When the parameter callType is set to fcpFormEvent the parameter req specifies the type of form event. The parameter req is set to the value formNew to permit the FCP to initialize its global data and allocate any other data structures it may require. The FCP is called with this parameter value after the individual fields have been initialized. The parameter req is set to the value formDispose to permit the FCP to dispose of any memory manager data structures that have been allocated. The FCP is called with this parameter value before the individual fields have their associated dispose functions performed. The parameter req is set to the value formIdle to permit the FCP to perform idle processing, such as updating a time field. The FCP is called with this parameter value before the idle messages are sent to the individual fields. The parameter req is set to the value formPack to notify the FCP that the individual fields have been packed into the mail message. The FCP can change the packed data or add additional data to the mail message. The parameter req is set to the value formUnpack to notify the FCP that the individual fields have been unpacked. The FCP can modify the unpacked data.

The parameter callType is set to the value fcpFieldPre to allow the FCP to perform customization before the TREV performs its standard functions for an event, such as keyboard entry. When the FCP returns to the TREV, the FCP can set the result code to the value TErrDealtWith to indicate that the TREV is to skip its standard processing for this event.

The parameter callType is set to the value fcpFieldPost to allow the FCP to perform customization after the FCP performs its standard functions for an event.

The parameter callType is set to the value fcpUserField to allow the FCP to perform customization for a user-defined field.

The parameter win contains a pointer to the window in which the form is displayed.

The parameter ident contains the identification of the field, which in a preferred embodiment is the secondary key from the form data structure.

The parameter req contains information on the type of event for which the FCP is being called. One skilled in art would know that other event types, such as list processing events, could be defined. The FCP is called with the parameter req set to the value reqCreate once for each field after a form is created. This allows the FCP to perform initialization associated with the field. The FCP is called with the parameter req set to the value reqDelete once for each field just before the form is disposed of. This allows the FCP to perform clean up for the field. The FCP is called with the parameter req set to the value reqUpdate for each field that needs to have its contents updated on the display. This allows the FCP to redisplay data after the window has been uncovered. The FCP is called with the parameter req set to the value reqIdle periodically for each field with the variable attributes set to the value attrIdle. This allows the FCP to update fields, such as a time field. The FCP is called with the parameter req set to the value reqCurrent for a field that has been tabbed to or clicked upon. This allows the FCP to customize a field when it becomes current. The FCP is called with the parameter req set to the value reqNotCurrent when the current field changes. The FCP is called with the parameter req set to the value reqEnable to indicate that the field has become enabled. The FCP is called with the parameter req set to the value reqDisable to indicate that the field has become disabled. The FCP is called with the parameter req set to the value reqKey to indicated that a key has been entered into the field. The FCP is called with the parameter req set to the value reqChosen to indicate that the defined equivalent key as stored in variable keyEquiv for the field has been entered. The FCP is called with the parameter req set to the value reqMouse whenever a mouse down event (click) occurs. The FCP is also passed the location of the cursor. The FCP is called with the parameter req set to the value reqEdit to indicates that an edit function, such as undo, cut, copy, paste, or clear, is requested for the field. The FCP is called with the parameter req set to the value reqHasData so that the FCP can return a value of true if the field has data and false otherwise. The FCP is called with the parameter req set to the value reqGetData so that the FCP can return the value of the data in the field. The FCP is called with the parameter req set to the value reqSetData so that the FCP can change the data in the field.

The parameter arg stores request-specific data.

Transaction Event Manager

Figure 5:
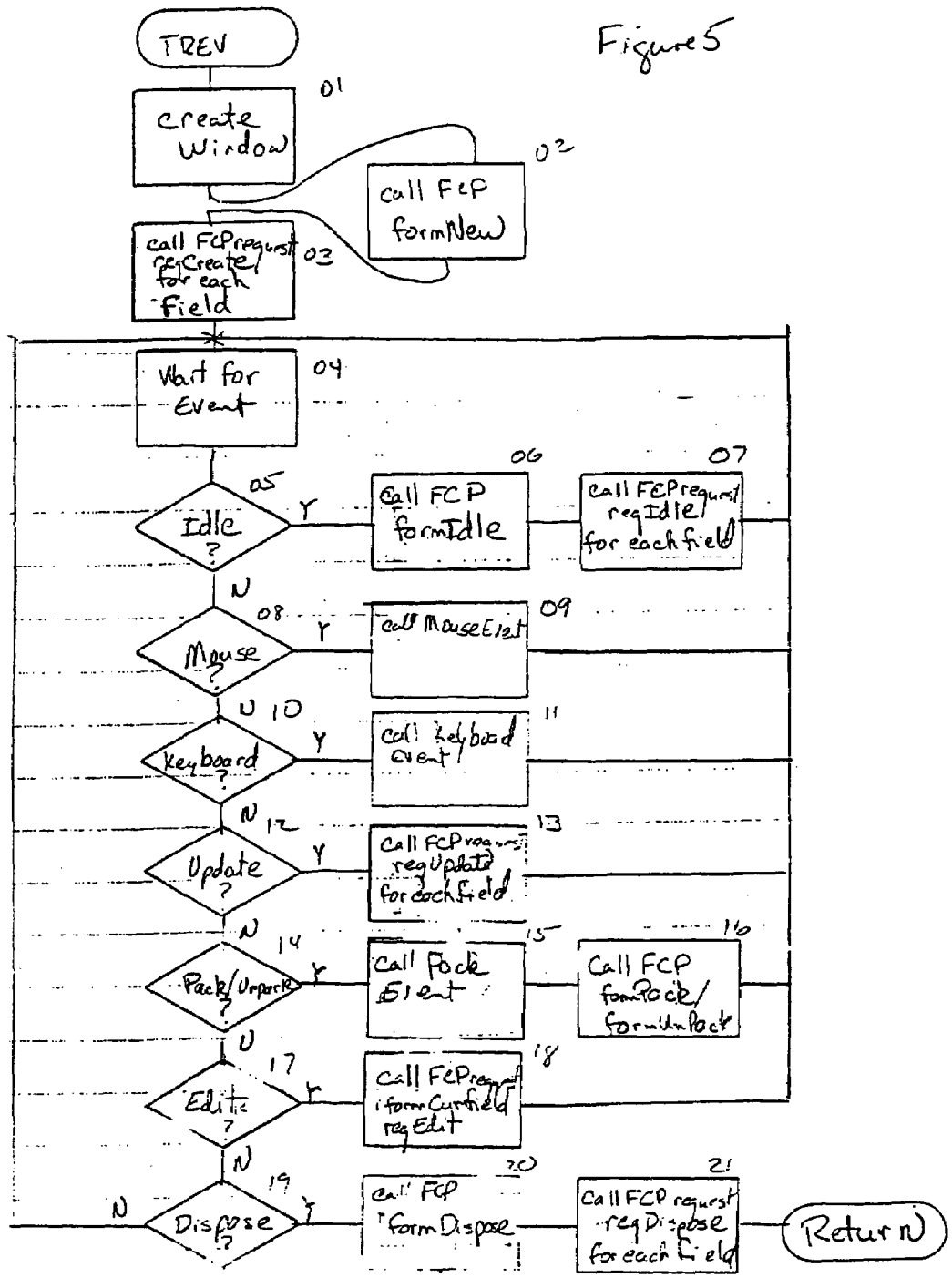
FIG. 5 is a flow diagram of the main routine of the TREV.

The Transaction Event Manager (TREV) is the portion of the mail system that manages the events associated with a form. FIGS. 5 through 11 are a flow diagram of the TREV. FIG. 5 is a flow diagram of the main TREV routine. This main routine creates a window for a form and then waits for events, such as, the click of a mouse or keyboard entry. When an event occurs, this routine determines the event type and calls the appropriate routine to process the event. In block 501, the routine performs the necessary interaction with the window manager to create a window for a form. The routine initializes the window in accordance with the specifications in the form data structure. In block 502, the routine calls subroutine FCP with the values fcpFormEvent and formNew to indicate that the form was just created. This call allows the FCP to perform customized initialization. Subroutine FCP is described below in detail. In block 503, the routine calls subroutine FCPrequest with the value reqCreate once for each field in the form data structure. These calls allow the FCP to perform custom initialization for each field. Subroutine FCPrequest is described below in detail.

In blocks 504 through 519, the routine waits for an event to occur, determines the event type, and calls the appropriate routines to process the event. In block 504, the routine waits until an event occurs. In block 505, if the event type is idle, then the routine continues at block 506 to process the idle event, else the routine continues at block 508. In block 506, the routine calls subroutine FCP with the values fcpFormEvent and formIdle to indicate that an idle event occurred. In block 507, the routine calls subroutine FCPrequest with the value reqIdle once for each field in the form data structure that has its attribute set to attrIdle. The routine then loops to block 504 to wait for the next event.

In block 508, if the event type is mouse, then the routine continues at block 509, else the routine continues at block 510. In block 509, the routine calls subroutine MouseEvent to process the mouse event. Subroutine MouseEvent is described in detail below. The routine then loops to block 504 to wait for the next event.

In block 510, if the event type is keyboard, then the routine continues at block 511, else the routine continues at block 512. In block 511, the routine calls subroutine KeyboardEvent to process the keyboard event. Subroutine KeyboardEvent is described in detail below. The routine then loops to block 504 to wait for the next event.

In block 512, if the event type is update, then the routine continues at block 513, else the routine continues at block 514. In block 513, the routine calls subroutine FCPrequest with the value reqUpdate once for each field in the form data structure. The routine then loops to block 504 to wait for the next event.

In block 514, if the event type is pack or unpack, then the routine continues at block 515 to process the pack or unpack, else the routine continues at block 517. In block 515, the routine calls subroutine PackEvent to pack or unpack a mail message. Subroutine PackEvent is described in detail below. In block 516, the routine calls subroutine FCP with value fcpFormEvent and value formPack or formUnpack, depending on the event type, to allow the FCP to modify the mail message data. The routine then loops to block 504 to wait for the next event.

In block 517, if the event type is edit, then the routine continues at block 518 to process the event, else the routine continues at block 519. In block 518, the routine calls subroutine FCPrequest with values formCurField from the form data structure and reqEdit. The routine then loops to block 504 to wait for the next event.

In block 519, if the event type is dispose, then the routine continues at block 520, else the routine loops to block 504 to wait for the next event. In block 520, the routine calls subroutine FCP with values fcpFormEvent and formDispose. In block 520, the routine calls subroutine FCPrequest with the value reqDispose once for each field in the form data structure. The routine then returns.

Figure 6:
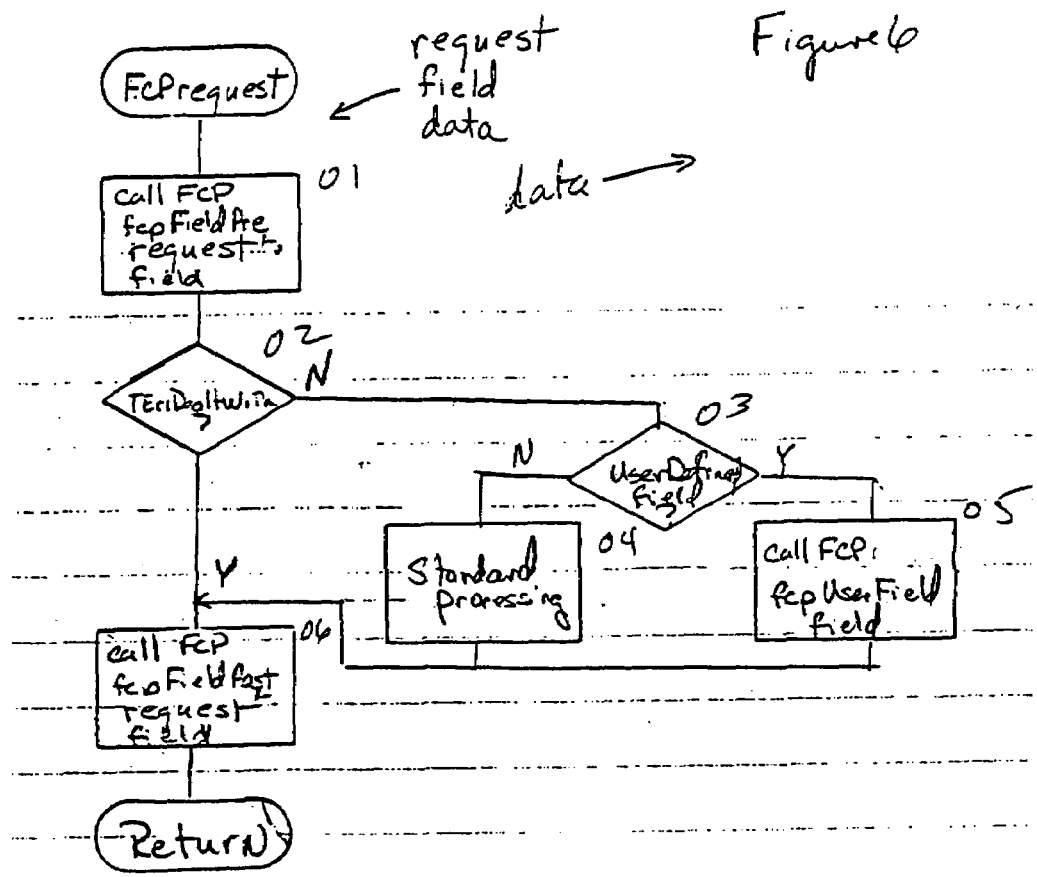
FIG. 6 is a flow diagram of subroutine FCPrequest.

FIG. 6 is a flow diagram of the FCPrequest subroutine. This subroutine controls calling the FCP before and after the standard processing is performed by the TREV. The parameters passed to this subroutine depend upon the request type, but typically include the field identification and data. In block 601, the routine calls subroutine FCP with the value fcpFieldPre, the passed request value, the field identification, and the data. This call allows the FCP to perform custom processing for the field. In block 602, if the FCP sets the result code to the value TErrDealtWith, then the routine continues at block 606, else the routine continues at block 603 to perform the standard processing for a field. In block 603, if the field type is UserField, then the routine continues at block 605, else the routine continues at block 604. In block 604, the routine performs the standard process for a field. For example, if the field is an editable text field and the event was the keyboard entry of a letter, then the routine would echo the letter to the display. The routine continues at block 606. In block 605, the routine calls subroutine FCP with the value fcpUserField and the field identification. Since there is no standard processing for a user-defined field, the TREV lets the FCP perform custom processing. The routine then continues at block 606. In block 606, the routine calls subroutine FCP with the value fcpFieldPost, the passed request value, the field identification, and the data. The routine then returns.

Figure 7:
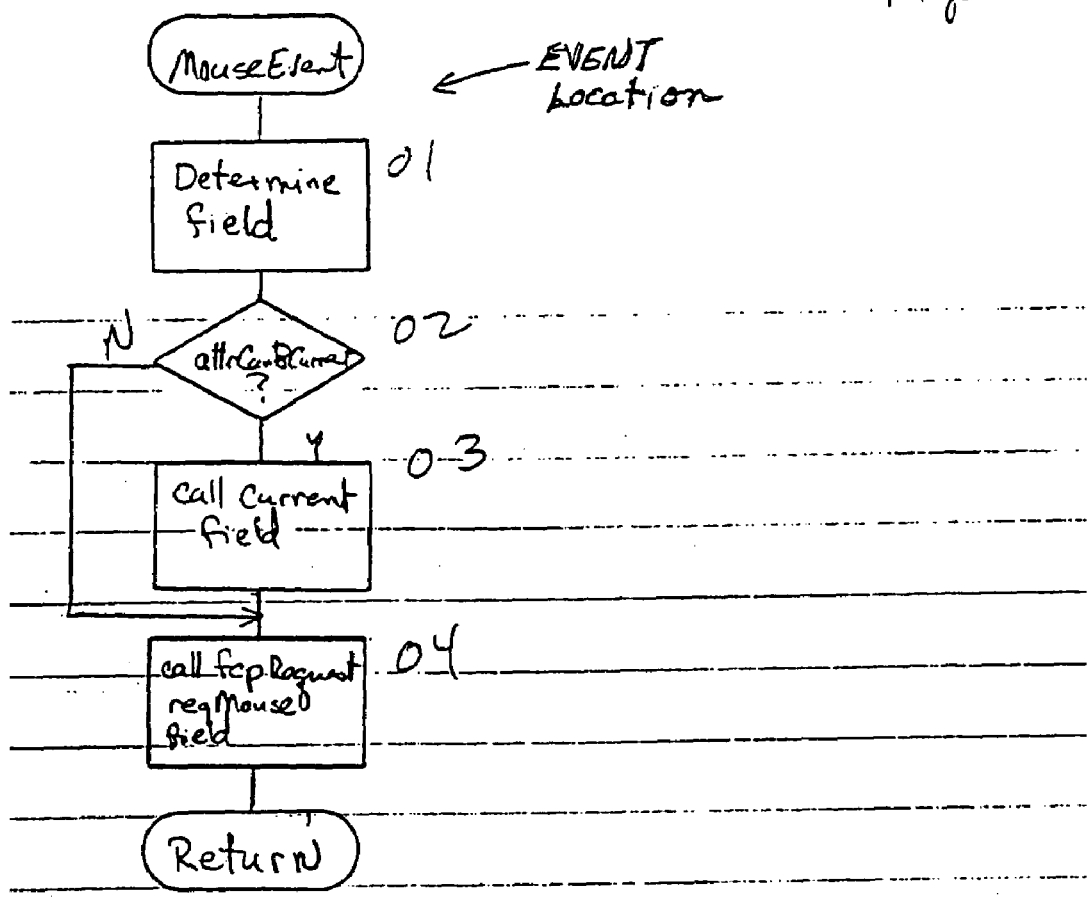
FIG. 7 is a flow diagram of subroutine MouseEvent.

FIG. 7 is a flow diagram of subroutine MouseEvent, which processes mouse events. The routine is passed the type of mouse event, such as click down, and the location of the cursor. In block 701, the routine determines at what field the cursor is located. In block 702, if the attribute for that field is attrCanBeCurrent, then the routine continues at block 703, else the routine continues at block 704. In block 703, the routine calls subroutine CurrentField to change the current field to the field just selected by the mouse event. Subroutine CurrentField is described in detail below. In block 704, the routine calls subroutine FcPrequest with the value reqMouse, the location, and the field identification. The routine then returns.

Figure 8:
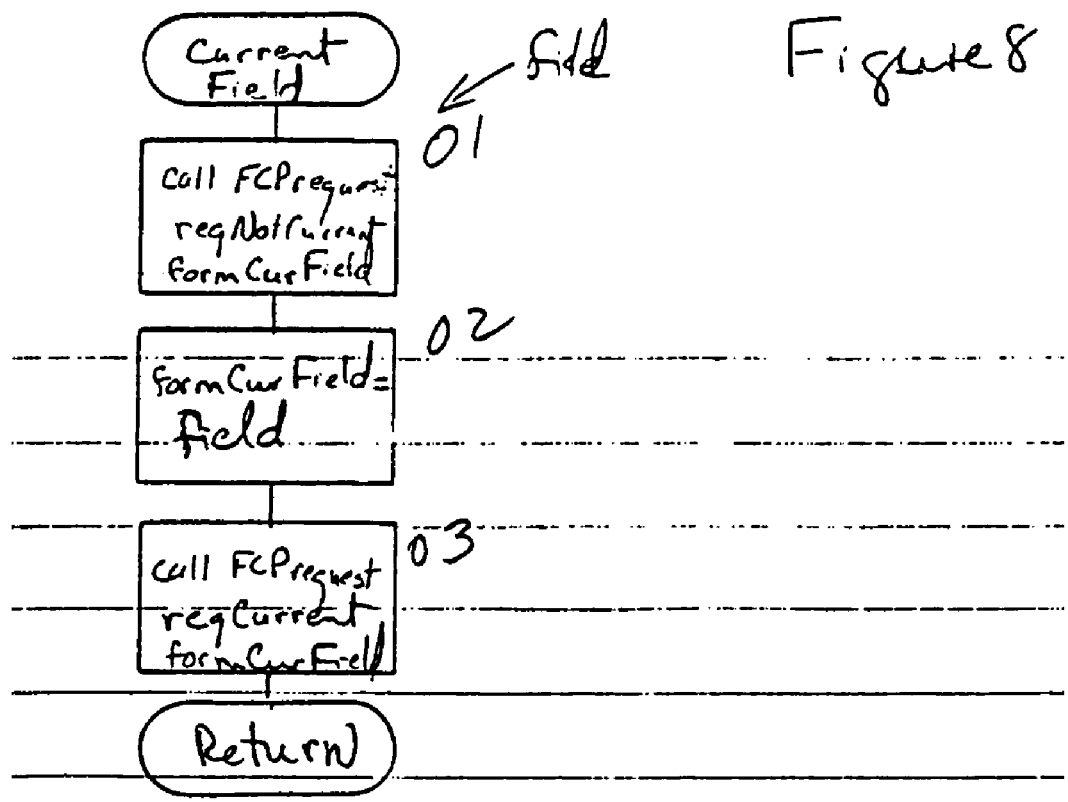
FIG. 8 is a flow diagram of subroutine CurrentField.

FIG. 8 is a flow diagram of the subroutine CurrentField, which switches the current field to the passed field. In block 801, the routine calls subroutine FCPrequest with value reqNotCurrent and the formCurField from the form data structure. This call switches the current field to a not current status. In block 802, the routine sets formCurField in the form data structure to the passed field. In block 803, the routine calls subroutine FCPrequest with values reqCurrent and the formCurField from the data structure. This call switches the new current field to a current status. The routine then returns.

Figure 9:
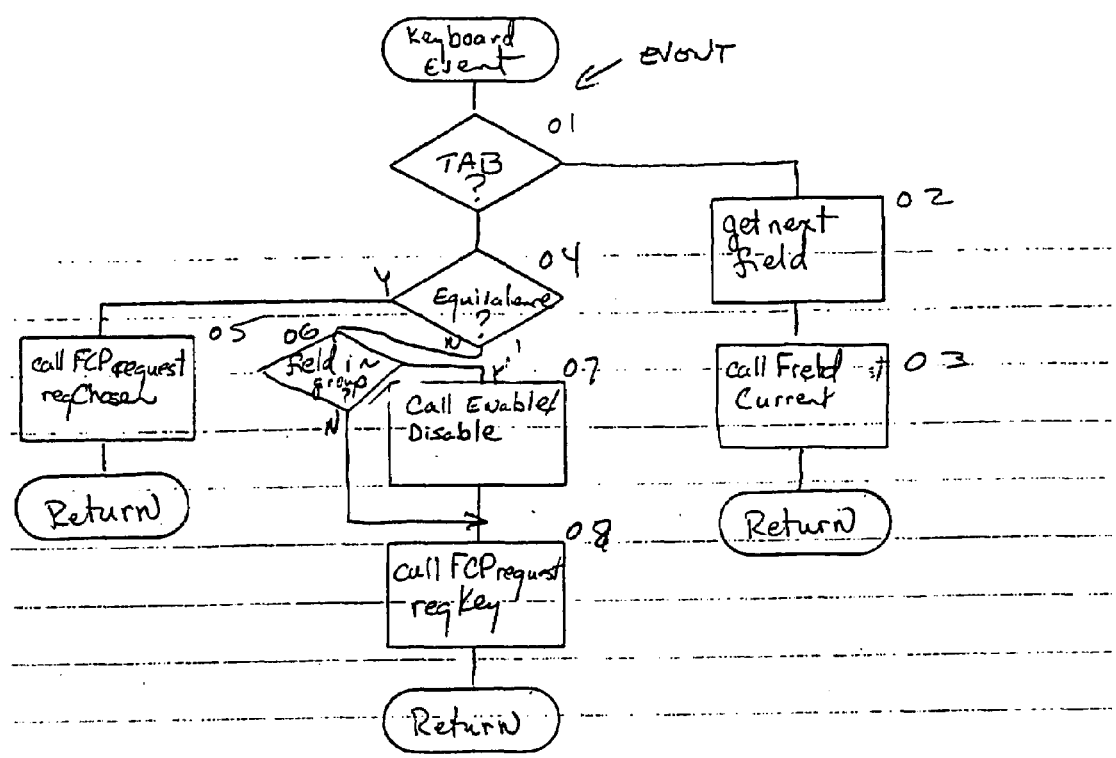
FIG. 9 is a flow diagram of subroutine KeyboardEvent.

FIG. 9 is a flow diagram of the subroutine Keyboard-Event, which processes keyboard events. This routine is passed the keyboard event type. In block 901, if the event is a tab key, then the routine continues at block 902, else the routine continues at block 904. In block 902, the routine determines the next field in the form data structure that has the attribute attrCanBeCurrent. In block 903, the routine calls subroutine FieldCurrent to set the next field to the current field and the routine then returns. In block 904, routine determines if the keyboard event corresponds to a equivalence key as defined for a field in the form data structure. If an equivalence is found, then the routine continues at block 905, else the routine continues at block 906. In block 905, the routine calls subroutine FCPrequest with the value reqChosen and the field for which the equivalence was found and then returns. In block 906, if the current field is in a group, then the routine continues at block 907, else the routine continues at block 908. In block 907, the routine calls subroutine Enable/Disable to enable or disable the fields in the group as appropriate. Subroutine Enable/Disable is described in detail below. In block 908, the routine calls subroutine FCPrequest with the value reqKey. The routine then returns.

Figure 10:
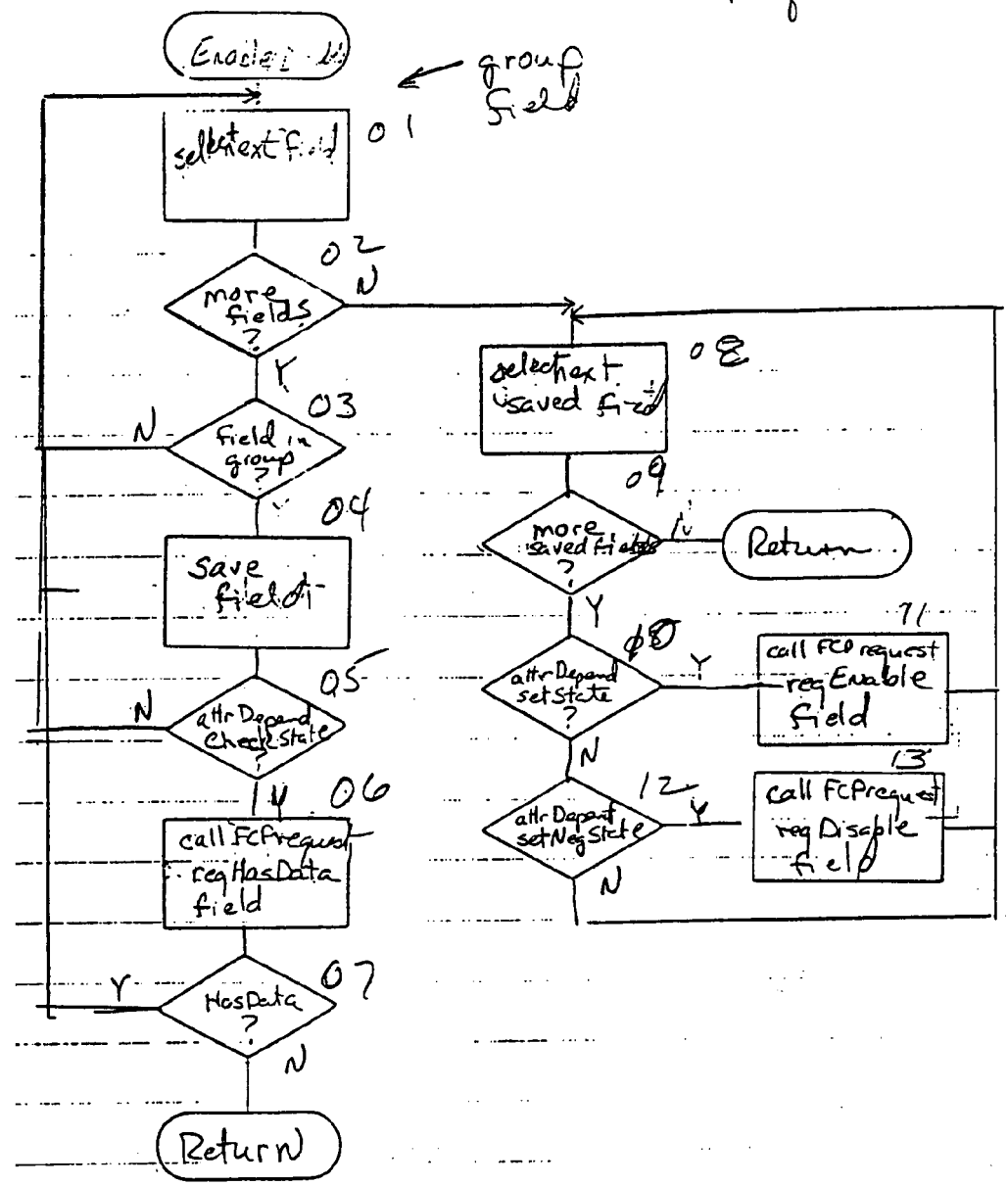
FIG. 10 is a flow diagram of subroutine Enable/Disable.

FIG. 10 is a flow diagram of the subroutine Enable/Disable, which enables or disables the fields in a group. In block 1001, the routine, starting with the first field in the form data structure, selects the next field. In block 1002, if all the fields have been selected, then the routine continues at block 1008, else the routine continues at block 1003. In blocks 1003 through 1007, the routine determines what fields are in the group and whether the dependencies are satisfied. In block 1003, if the selected field is in the group, then the routine continues at block 1004, else the routine loops to block 1001 to select the next field. In block 1004, the routine maintains a list of the fields in the group. In block 1005, if the attribute of the selected field is attrDependCheckState, then the routine continues at block 1006, else the routine loops to block 1001 to select the next field. In block 1006, the routine calls subroutine FCPrequest with the value reqHasData. In block 1007, if the field has data, then the routine loops to block 1001 to select the next field, else the routine returns because the dependency failed. In blocks 1008 through 1013, since the dependency is satisfied, the routine enables or disables the fields in the group. In block 1008, the routine, starting with the first field in the saved list of fields (which comprises the group), selects the next field in the group. In block 1009, if there are more fields in the list, then the routine continues at block 1010, else the routine returns. In block 1010, if the attribute for the selected field is attrDependSetState, then the routine continues at block 1011, else the routine continues at block 1012. In block 1011, the routine calls subroutine FCPrequest with the value reqEnable to enable the field and then the routine loops to block 1008 to select the next field in the group. In block 1012, if the attribute for the selected field is attrDependSetNegState, then the routine continues at block 1013, else the routine loops to block 1008 to select the next field in the group. In block 1013, the routine calls subroutine FCPrequest with the value reqDisable to disable the field and the routine loops to block 1008 to select the next field in the group.

Figure 11:
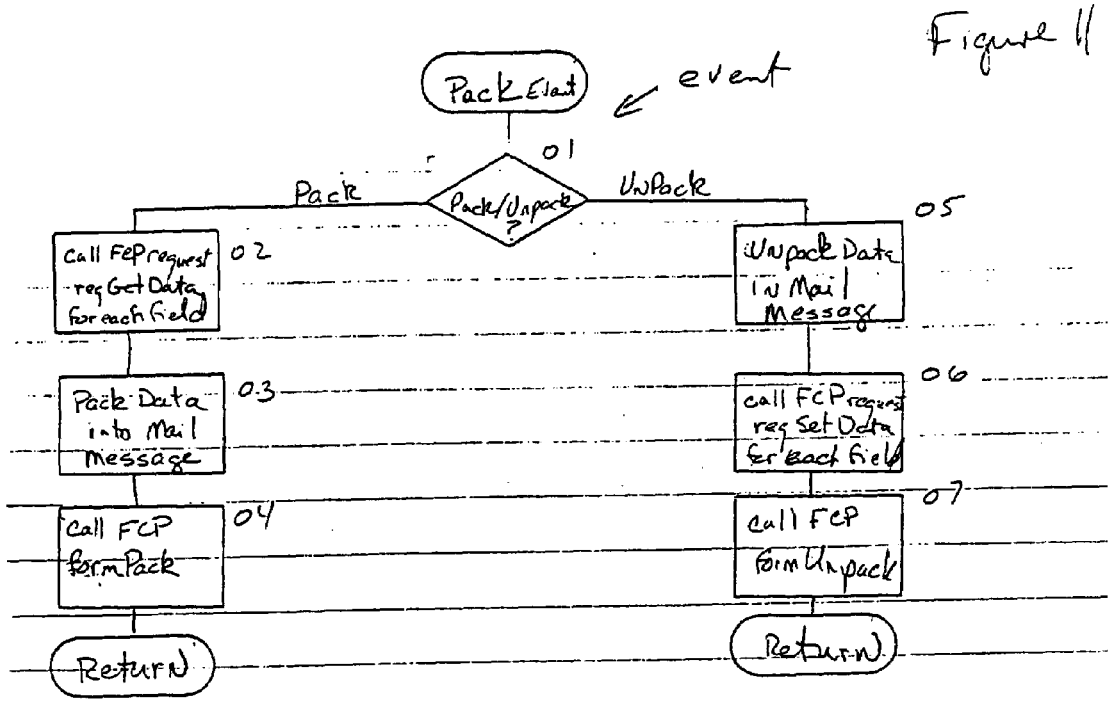
FIG. 11 is a flow diagram of subroutine PackEvent.

FIG. 11 is a flow diagram of subroutine PackEvent, which packs or unpacks the form data into or from a mail message. In block 1101 if the event type is a pack, then the routine continues at block 1102, else the event type is an unpack and the routine continues at block 1105. In block 1102 through 1104, the routine packs the form data into a mail message. In block 1102, the routine calls subroutine FCPrequest with the value reqGetData once for each field in the form data structure with the attribute of attrPack. In block 1103, the routine packs the data that is returned from the request to get data into a mail message. In block 1104, the routine calls subroutine FCP with value formPack. This call allows the FCP to modify the packed mail message. The routine then returns. In block 1105 through 1107, the routine unpacks the data in the mail message. In block 1105, the routine unpacks the data from the mail message and stores the data in the form data structure. In block 1106, the routine calls subroutine FCPrequest with the value reqSetData once for each field in the form data structure with the attribute of attrPack. In block 1107, the routine calls subroutine FCP with the value formUnPack to allow the FCP an opportunity to modify the unpacked data. The routine then returns.

Form Control Procedure

Figure 12:
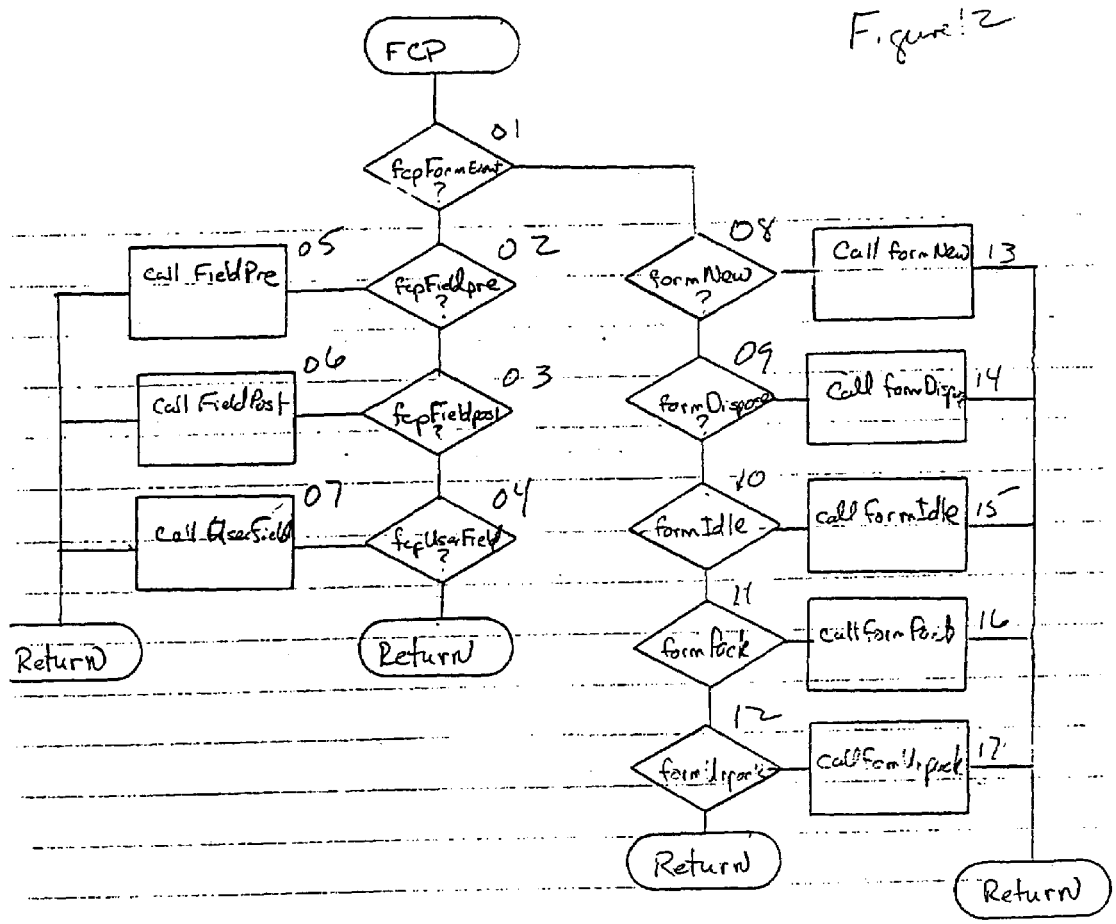
FIG. 12 is a flow diagram of subroutine FCP.

FIG. 12 is a flow diagram of the main routine of a typical FCP. This flow diagram shows the procedure for determining the callType in blocks 1201 through 1204, and determining the form events in blocks 1208 through 1212. In blocks 1205 through 1207 and blocks 1212 through 1217, the FCP calls the subroutines to process the events. The subroutines implement the customization of the form.

Figure 13:
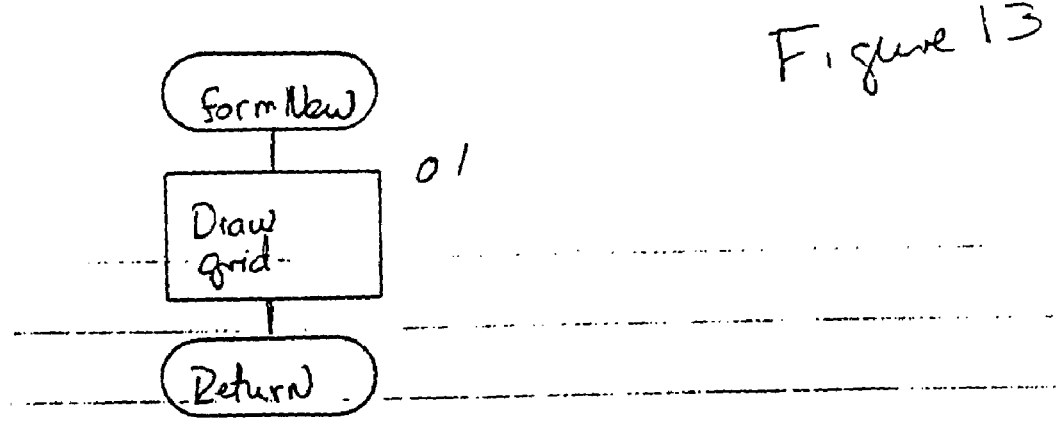
FIG. 13 is a flow diagram of subroutine formNew.

FIGS. 13 and 14 are an example of a flow diagram of the routine to process the events for an FCP that implements a game of tick-tack-toe. FIG. 12 is the flow diagram for the main routine in the FCP for this example. The customized form in this example works as follows. There are nine fields fields in the form. Each field corresponds to a location in a tick-tack-toe grid. The fields contain either no data, an X, or an O. The first player would click the mouse over one of fields. The FCP detects that this field becomes the current field, draws an X in the field, and sets the data in the field to an X. The first player would request that the mail system send the message to the second player. When the message arrives at the second player, the FCP would draw the tick-tack-toe grid and draw an X in the appropriate field. The second player would move the cursor to a field and click the mouse. The FCP would draw an O in that field. The second player would then send the message to the first player. Play would continue until one of the players wins or all the fields contain an X or an O (a tie). When a player wins, the FCP draws a line through the winning fields and prohibits the placement of any other X's or O's. The FCP also prohibits placing an X or an O in a field that is already occupied.

FIGS. 13 and 14 show the flow diagrams for subroutines formNew and fieldPre that are called by the main FCP routine shown in FIG. 12. This example of tick-tack-toe using a customizable form could be made more sophisticated, for example, by allowing a player to change his mind before the mail is sent. FIG. 13 shows the flow diagram for subroutine formNew. The only function of this routine is to draw the tick-tack-toe grid after the window is created.

FIG. 14 shows the diagram for the subroutine fieldPre. The subroutine performs all the substantive processing for the implementation of the game. In block 1401, if the value in the parameter req is reqUnPack, then the routine initializes the grid with the current value of the field by continuing at block 1402, else the routine continues at block 1406. In blocks 1402 through 1405, the routine draws an X or an O in the field that is being unpacked, as appropriate. In block 1402, if the data in the field is an X, then the routine continues at block 1403, else the routine continues at block 1404. In block 1403, the routine draws an X in the field and continues at block 1413. In block 1404, if the data in the field is an O, then the routine continues at block 1405, else the routine continues at block 1413. In block 1405, the routine draws an O in the field and continues at block 1413.

In block 1406, if the variable winner is set, then the routine continues at block 1407, else the routine continues at block 1408. In block 1407, the routine sets the result code to the value TErrDealtWith to indicate that the TREV will not need to perform its standard processing for this event. The routine then returns.

In block 1408, if the value of parameter req is reqCurrent, then the routine continues at block 1409, else the routine returns. In block 1409, if data is in the field, then the routine returns because an X or an O is already in the field, else the routine continues at block 1410. In block 1410, if there are an even number of fields with data, then it is X's turn and the routine continues at block 1412, else it is O's turn and the routine continues at block 1411. In block 1411, the routine draws an O in the field and sets the field data value to indicate an O. In block 1412, the routine draws an X in the field and sets the field data value to indicate an X.

In block 1413, the routine determines if there is a winner and if so, then the routine continues at block 1414, else the routine continues at block 1415. In block 1414, the routine draws a line through the grid to indicate the winning fields and set the variable winner. In block 1415, the routine sets the result code to the value TErrDealtWith to indicate that the TREV will not need to perform its standard processing for this event. The routine then returns.

In a preferred embodiment, each user of the electronic mail system has access to the custom forms. In a local area network, the data structure for a form could be stored on a file server. Each user who sends and receives messages using a custom form would download the form from the file server to create or view the message. The mail message that is sent would specify the custom form associated with the message. Alternatively, the custom form could be sent to the recipient as part of the mail message. In a preferred embodiment, each custom form has an associated icon. The mail system would display the icon to indicate that the custom form is available to the user.

It will be appreciated that, although specific embodiments of the invention have been described herein for purposes of illustration, various modifications may be made without departing from the spirit and scope of the invention. Accordingly, the invention is not limited except as by the appended claims.

The invention claimed is:

1. A data processing system for displaying and receiving data through user-defined custom forms, each form having a plurality of fields, each field representing a form component and having an associated description indicating characteristics of the field for use in displaying the field and in utilizing the field to obtain and present the data and a standard behavior indicating standard operations associated with the field, the data processing system comprising:
    means for storing a form data structure having a field object with one or more attributes for each field of the form, the one or more attributes comprising at least one of (i) a group attribute to indicate that the field is in a particular attribute group for enabling or disabling the field based on any other fields within the particular attribute group, or (ii) an idle attribute to indicate that a form control procedure for the form is called periodically;
    means for storing the form control procedure which is customized to control behavior of the form, wherein the behavior of the form indicates operations associated with the form;
    a transaction event processor that includes
        means for selecting one of the plurality of forms;
        means for retrieving the form data structure and form control procedure for the selected form;
        means for receiving input from a user of the computer system;
        means for, in response to receiving the user input, invoking the form control procedure whereby the form control procedure performs a custom behavior for the fields of the form, the custom behavior indicating user-defined operations associated with the fields of the form; and
        means for performing the standard behavior for the fields of the form when custom behavior is not performed;
    means for packing the user input into the user-input data structure; and
    means for presenting user input from the user-input data structure to a designated user in accordance with a form data structure for displaying the user input.

2. The data processing system of claim 1 wherein the means for invoking the form control procedure includes means for invoking the form control procedure of the retrieved form data structure to initially display each of the plurality of fields on a display device.

3. The data processing system of claim 1 wherein the means for invoking the form control procedure includes means for invoking the form control procedure after receiving user input and before performing the standard behavior for the field to which the user input is directed.

4. The data processing system of claim 3 wherein the form control procedure returns an indication to suppress the performing of the standard behavior for the field to which the user input is directed.

5. The data processing system of claim 3 wherein the form control procedure returns an indication to perform the standard behavior for the field to which the user input is directed and including means for performing the standard behavior for the field to which the user input is directed.

6. The data processing system of claim 1 wherein the means for invoking the form control procedure includes means for invoking the form control procedure after performing the standard behavior for the field to which the user input is directed.

7. The data processing system of claim 1 wherein the means for invoking the form control procedure includes:

means for invoking the form control procedure once for each field of the form to effect the display of the fields of the form;

means for invoking the form control procedure upon receiving user input, passing to the form control procedure an indication of the field to which the user input is directed, and returning from the form control procedure an indication whether to perform the standard behavior for the field to which the user input is directed;

means for invoking the form control procedure after determining whether to perform the standard behavior for the field to which the user input is directed and passing to the form control procedure an indication of the field to which the user input is directed whereby the form control procedure effects the customizing of the behavior of the form by adding to and overriding the standard behavior of the fields.

8. The system of claim 1, wherein the one or more attributes includes the group attribute.

9. The system of claim 1, wherein the one or more attributes includes the idle attribute.

10. A method for presenting data collected from custom forms in a data processing system, the data processing system including a display device for displaying the forms and an input device for receiving input data, each form having a plurality of fields, each field representing a form component and having an associated description indicating characteristics of the field for use in displaying the field and utilizing the field to obtain and present data and a standard behavior indicating standard operations associated with the field, the method comprising the steps of:

retrieving a form data structure for a form, to be displayed, the form data structure having a field object with one or more attributes for each field of the form, the one or more attributes comprising at least one of (i) a group attribute to indicate that the field is in a particular attribute group for enabling or disabling the field based on any other fields within the particular attribute group, or (ii) an idle attribute to indicate that a form control procedure for the form is called periodically;

retrieving a form control procedure, the form control procedure for providing custom behavior for the fields of the form, the custom behavior indicating user-defined operations associated with the fields of the form;

for each field of the form, invoking the form control procedure and specifying the field wherein the form control procedure controls the displaying of the specified field;

for each of a plurality of fields of the form, receiving input data through the input device, the input data being data directed to the field;

for each received input data, invoking the form control procedure specifying the input data and an indication of field to which the input data is directed, so that the form control procedure can override the standard behavior of the field;

for each field of the form, invoking the form control procedure specifying the field wherein the data directed to the field is prepared for presentation; and presenting the prepared data according to the form control procedure.

11. The method of claim 10, including the step of processing the retrieved form data structure along with the prepared data so that a recipient of the processed data can use the form data structure to display the processed data.

12. A method of collecting data in a data processing system of a computer system, the computer system having a display device for displaying a plurality of forms developed by a user of the data processing system and an input device for inputting data, each form having a plurality of fields, each field representing a form component and having an associated description indicating characteristics of the field for use in displaying the field and utilizing the field to obtain the data and a standard behavior indicating standard operations associated with the field, the method comprising the steps of:

for each of the forms, storing a form control procedure and a data description, as opposed to a program instruction description, of the fields of the form, including field placement, in a form data structure, the form control procedure for overriding the standard behavior associated with each of the fields, the form data structure including a field object with one or more attributes for each field of the form, the one or more attributes comprising at least one of (i) a group attribute to indicate that the field is in a particular attribute group for enabling or disabling the field based on any other fields within the particular attribute group, or (ii) an idle attribute to indicate that a form control procedure for the form is called periodically;

selecting one of the plurality of forms;

retrieving the form data structure for the selected form;

for each of the fields of the selected form, invoking the form control procedure of the retrieved form data structure to control the displaying of the field on the display device;

for each of a plurality of fields of the selected form;

receiving user input from the input device, the user input being directed to the field;

prior to performing the standard behavior of the field to which the user input is directed, invoking the form control procedure of the retrieved form data structure and passing to the form control procedure the received user input and an indication of the field to which the user input is directed wherein the form control procedure determines whether to override the standard behavior of the field to which the user input is directed;

when the form control procedure determines to override the standard behavior, performing a custom behavior for the field to which the user input is directed, the custom behavior indicating user-defined operations associated with the fields of the form; and returning an indication as to whether the standard behavior has been overridden; and performing the standard behavior for the field only if the standard behavior has not been overridden.

13. A method in a data processing system of a computer system for storing a custom form, the custom form having a plurality of fields, each field representing a form component and having a description indicating characteristics of the field for use in displaying the field and in utilizing the field to obtain and present the data and a standard behavior indicating standard operations associated with each field, the method comprising the steps of:

storing a form header containing data describing a window into which fields are to be displayed on a display device;

for each field, storing a field object having a data description, as opposed to a program instruction description, of the field, including field placement, wherein the field object includes one or more attributes for each field of the form, the one or more attributes comprising at least one of (i) a group attribute to indicate that the field is in a particular attribute group for enabling or disabling the field based on any other fields within the particular attribute group, or (ii) an idle attribute to indicate that a form control procedure for the form is called periodically; and storing a form control procedure, the form control procedure for receiving data that is input into a field and an indication of the field, for determining whether to perform a custom behavior for the field, and prior to the standard behavior for the field being performed, for performing the custom behavior for the field and returning an indication as to whether the standard behavior for the field is to be performed, the custom behavior indicating user-defined operations associated with the fields of the form.

14. The method of claim 13 wherein the step of storing a form header comprises the steps of:

storing a primary key for retrieving the form header and wherein the primary key designates a location of the form header;

storing form flags for specifying the window appearance;

storing form coordinates specifying the position and size of the window; and storing a character string for use as a form title.

15. The method of claim 13 wherein the step of storing a field object comprises the steps of:

storing a primary key for retrieving the field object and wherein the primary key designates a location of the field object;

storing a secondary key for providing an alternative means for retrieving the field object and wherein the seconding/key designates a location of a unique identifier for the field;

storing a field type;

storing attributes of the field;

storing coordinates of the field; and storing font characteristics of the field.

16. The method of claim 13 wherein the step of storing a form control procedure comprises the steps of:

storing a primary key for retrieving the form control procedure and wherein the primary key designates a location of the form control procedure; and storing a computer code that implements the custom behavior of the fields.

17. A method in a data processing system for inputting user input into a custom form, the user input for being displayed by a recipient of the user input, the data processing system having a plurality of field types, each field type having a standard behavior, the method comprising the steps of:

retrieving a data description, as opposed to a program instruction description, of each field to be displayed on the custom form, the description indicating characteristics of the field for use in displaying the field, including field placement, and in utilizing the field to obtain and present the user input at the data processing system;

retrieving a form control procedure for the custom form, the form control procedure for receiving data directed to a field of the form and an indication of the field to which the data is directed;

displaying the custom form on a display device;

receiving data directed to a field of the displayed custom form;

prior to performing the standard behavior for the field to which the data is directed, invoking the retrieved form control procedure and passing to the form control procedure the received data and an indication of the field to which the data is directed;

under control of the form control procedure, performing a custom behavior for the field to which the data is directed, the custom behavior including modifying the display of a field other than the field to which the data is directed; and returning an indication whether to perform the standard behavior for the field to which the data is directed;

performing the standard behavior for the field to which the data is directed only if the returned indication indicates to perform the standard behavior for the field; and packaging the data for the fields of the form into a data structure, wherein the data structure includes a field object with one or more attributes for each field of the form, the one or more attributes comprising at least one of (i) a group attribute to indicate that the field is in a particular attribute group for enabling or disabling the field based on any other fields within the particular attribute group, or (ii) an idle attribute to indicate that the form control procedure for the form is called periodically.

18. The method of claim 17 including the steps of:

re-invoking the retrieved form control procedure and passing to the retrieved form control procedure an indication of the field to which the data is directed; and under control of the re-invoked form control procedure, performing further custom behavior for the field to which the data is directed.

19. The method of claim 17 wherein the step of displaying the custom form further includes for each field of the form, invoking the form control procedure and passing to the form control procedure an indication of the field which identifies the field; and under control of the form control procedure, displaying the indicated field.

20. The method of claim 17 including the steps of:

packaging the retrieved description and the retrieved form control procedure into the data structure; and processing the data structure such that the recipient of the data structure uses the packaged description and form control procedure to display the data for the fields of the form.

* * * * *